United States Patent [19]

Oblonsky

[11] 4,313,196
[45] Jan. 26, 1982

[54] PRIORITY SYSTEM WITH LOW SPEED REQUEST BUS

[75] Inventor: Jan G. Oblonsky, Brookeville, Md.

[73] Assignee: International Business Machines Corp., Armonk, N.Y.

[21] Appl. No.: 108,069

[22] Filed: Dec. 28, 1979

[51] Int. Cl.$^3$ .............................................. H04J 3/16
[52] U.S. Cl. ...................................... 370/85; 370/95; 364/200
[58] Field of Search ...................... 370/85, 90, 93, 95, 370/96, 89, 80; 364/200

[56] References Cited

U.S. PATENT DOCUMENTS

| | | | |
|---|---|---|---|
| 3,755,628 | 8/1973 | Games et al. | 370/85 |
| 3,870,825 | 3/1975 | Roberts et al. | 370/85 |
| 3,983,540 | 9/1976 | Keller et al. | 364/200 |
| 4,120,029 | 10/1978 | Steiner | 364/200 |
| 4,220,822 | 9/1980 | Kawai et al. | 370/85 |

FOREIGN PATENT DOCUMENTS 2901762  8/1979  Fed. Rep. of Germany ........ 370/95

OTHER PUBLICATIONS

IBM Tech. Disc. Bulletin, vol. 22, No. 2, Jul. 1979, pp. 863-865, "Bus Architecture . . . ".
IBM Tech. Disc. Bulletin, vol. 23, No. 4, Sep. 1980, pp. 1323-1325.

*Primary Examiner*—Douglas W. Olms
*Attorney, Agent, or Firm*—W. S. Robertson

[57] ABSTRACT

A new polling apparatus for units on a shared bus of a data processing system operates with a relatively slow multi signal line request bus and a relatively slow local counter. The local counter divides each time slot into a few sub-slots. Each sub-slot is assigned to two or more units in a priority sequence and during a sub-slot the assigned units contend for access to the bus by raising signals on particular lines of the request bus according to their priority within the sub-slot.

4 Claims, 3 Drawing Figures

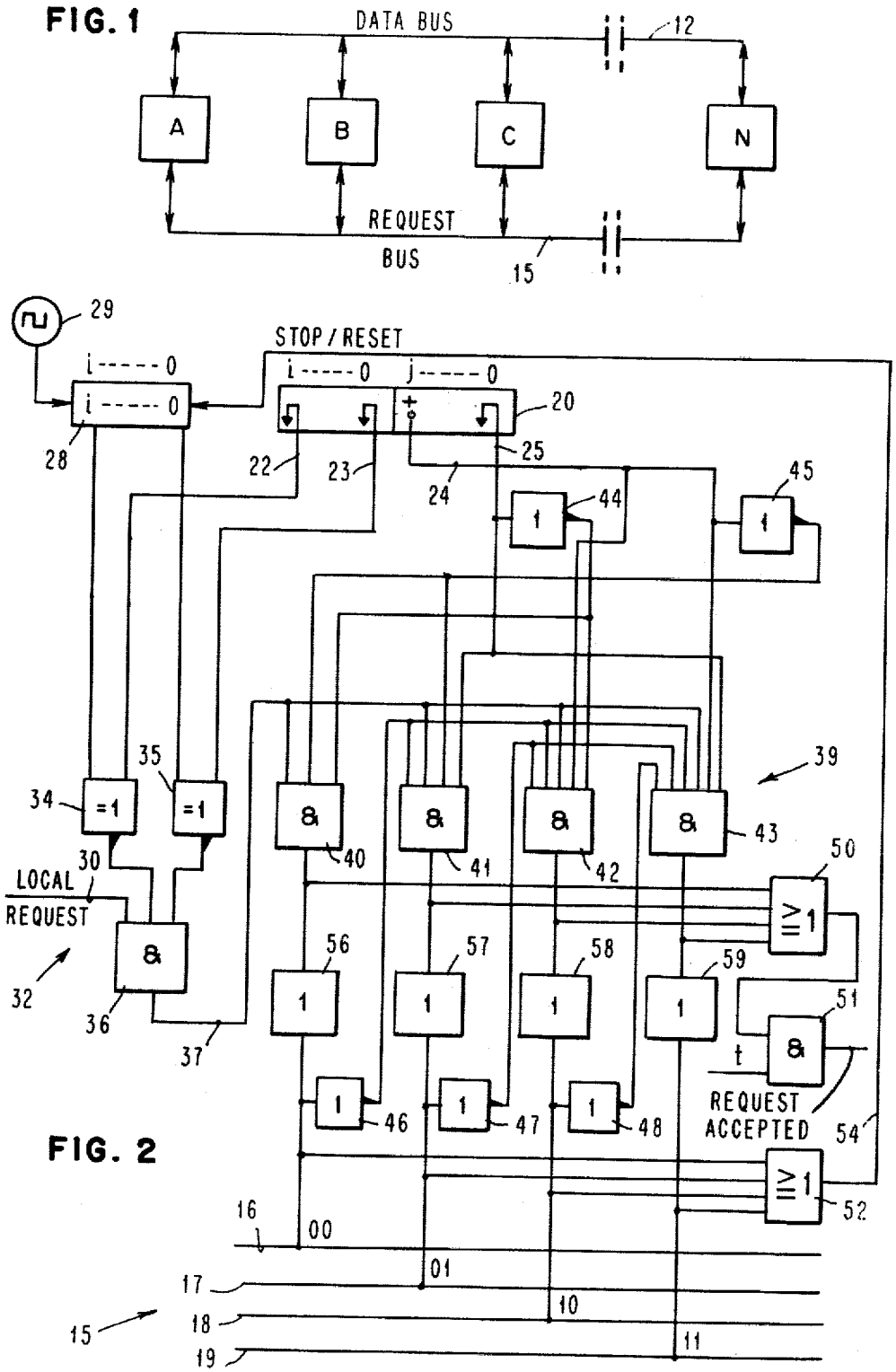

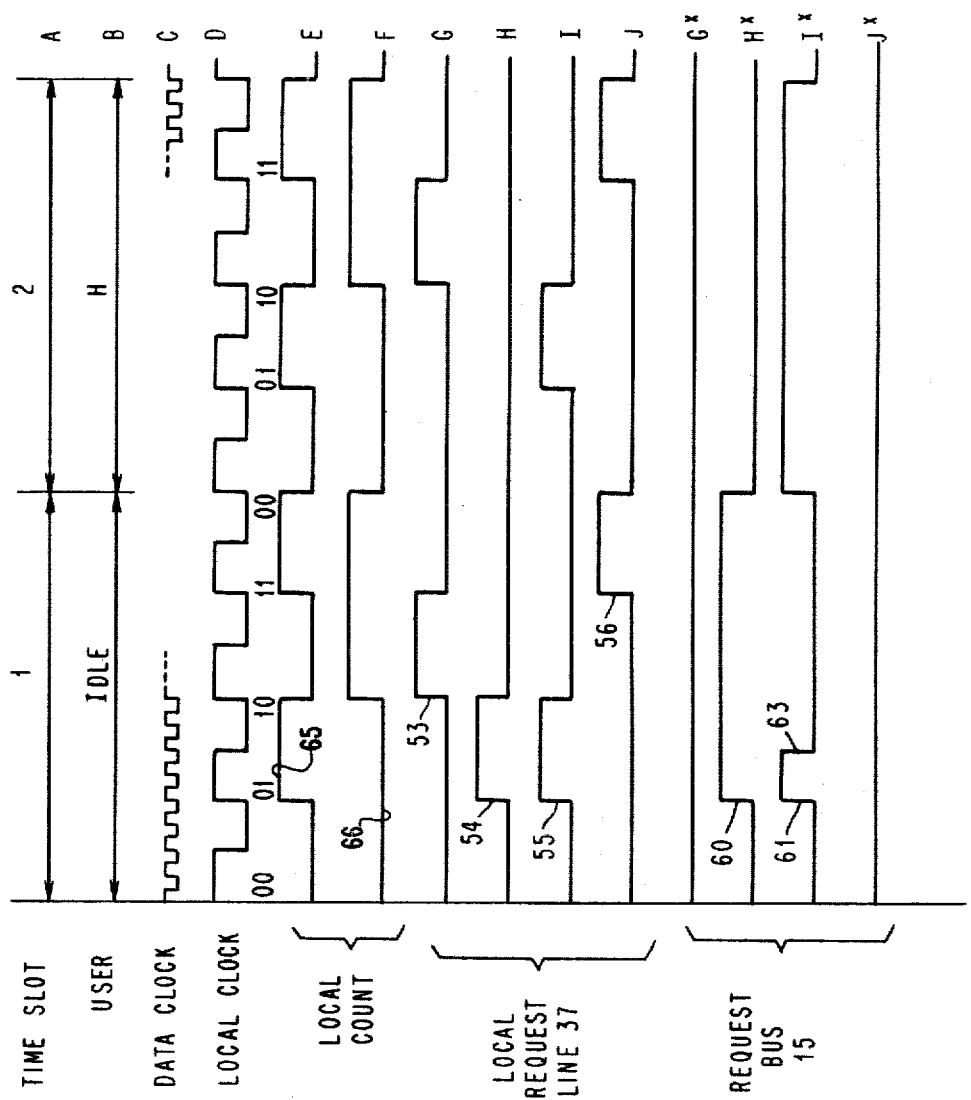

PRIORITY SYSTEM WITH LOW SPEED REQUEST BUS

INTRODUCTION

This invention relates generally to a system and apparatus for interconnecting units of a data processing system for transferring information between the units. For example, a number of units can each be connected to a common bus so that any unit can place a message on the bus and each message on the bus can be received by any other unit. One unit, for example, a keyboard-printer terminal, can communicate with another unit, for example, a processor, by placing data on the bus along with suitable additional information. The additional information includes the address of the sender since the message can be read by every other unit on the bus but will ordinarily be intended for only one receiving unit. The additional information also usually includes the address of the sender, error correction bits, and other information in a standard format. The data portion of the message may include any kind of information such as data to be stored or displayed or otherwise processed, additional information about the message, commands to be executed, and so on.

The physical arrangement of the bus may take various forms such as a coaxial cable for transmitting data serially, or a multi-conductor bus for transmitting data as a series of multi-bit data units. It will simplify the following explanation to consider only a single line serial bus in most examples. In either case, each message extends in time over a number of bit times. For example, the message might have a standard format of 16 bits that make up two bytes of eight bits each and these 16 bits can be transmitted serially during a fixed interval of time that is called a time slot. For example, after unit A has transmitted two bytes in time slot 1, either unit A or some other unit would transmit two more bytes in time slot 2.

The units on the bus are synchronized by a common clock signal in order to permit one message to follow directly after another message and also to establish a format that defines the occurrence of a bit position on the bus.

This invention relates more specifically to a system and apparatus for assigning time slots to particular units in an orderly and efficient way. In a simple system of low efficiency which is seldom used, each unit might be given access to the bus at predetermined periodic time slots to be used or not depending on whether the unit had a message to send at its preassigned time. In another simple system that is seldom used, a unit having a message to transmit might simply begin transmitting in the next time slot. In most systems however, the data capacity of the bus is coordinated with the number of units on the bus to provide for transmission of messages on the bus during an optimum portion of the available time slots and to accommodate the situation in which several units contend for each time slot on the bus. A system of priority gives access to the bus in an orderly way.

Priority is commonly designated by a multi-bit binary code that is assigned to each unit. For example, if unit A is assigned priority code 0010 (decimal 2) and unit B is assigned 0110 (decimal 6), A's number will come up first in the binary counting sequence and A will receive priority over B. Such a numbering system can be semi-permanently established by electrical connections within a unit or the priority numbers can be stored in local registers and can be changed as desired. In addition, the priority apparatus can depart from the straight numerical sequence in various ways, for example to prevent high priority units from totally excluding low priority units. These variations in conventional features of bus priority systems are either independent of my invention or are readily adapted to the specific apparatus that will be described later.

With the preceding background, it will now be helpful to consider a more specific priority system. Suppose that there are 16 units on the bus and that unit A in this example has priority 0010 (decimal 2). Each unit has a four bit counter that counts in the sequence 0000-1111, that is, through all of the priority numbers. This counting sequence is completed during each time slot. In this example a count for the priority operation corresponds to a clock pulse for reading and writing data on the bus, but this is not a necessary requirement of this system and intervals of this counter will be called "sub-slots" to help maintain this distinction. Each unit has one of these counters or otherwise is arranged to receive the count and it has a circuit for comparing the counter value with the pre-assigned priority code and for signalling equality or inequality. Thus, in the sub-slots in which all of the counters read 0010, unit A finds equality between the counter and its assigned priority number and each other unit finds inequality. If unit A has a preceding request for access to the bus at this time, it can take some action to signal the other units that it will use the next time slot and thereby prevent a lower priority unit from responding to the poll. In the system being described, each unit also is interconnected by a "request" line that is energized by a unit that has a request for access to the bus and finds equality between the counter value and its priority number, and such a unit raises a signal on this line to take priority to the next time slot. This signal inhibits any unit of low priority from taking access to the bus on the next time slot. For example the signal on the request line can be connected at each unit to act as a busy signal or to otherwise be used by the conventional components that each unit otherwise has for controlling its access to the bus, or the signal can inhibit further operation of the priority circuit and stop or re-set all of the counters to 0000 until they are started at the beginning of the next time slot.

SUMMARY OF THE INVENTION

A broad object of this invention is to improve the system that has just been described. A more specific object is to provide a system that uses relatively low speed counters for priority assignment.

An important concept of the invention can be understood from Table 1. The number of units of the system is designated n. To continue the previous examples, n=16. As Table 1 shows, the priority assignments of the units can be visualized as a matrix of i rows and j columns. The product i×j equals n or greater and the sum i+j of course equals the number of bits in the counter of the system described previously. The priority number of any unit identified in the matrix can be found by taking the row heading as the high order bits and taking the column heading as the low order bits. Unit A as in the previous example is assigned priority code 0010 and it is located in the table at the intersection of the row having the heading 00 and the column having the heading 10.

TABLE 1

|    | 00 | 01 | 10 | 11 |
|----|----|----|----|----|
| 00 | E  | P  | A  | K  |
| 01 | F  | H  | K  | C  |
| 10 | G  | B  | L  | O  |
| 11 | D  | M  | N  | J  |

According to this invention, each unit has a storage device that holds the priority code as in the system described earlier but the code is handled as i high order bits and j of low order bits. Each local unit also has an i-bit counter that is run synchronously with similar counters of each of the other unit as in the system already described. The system includes a cable having a number of signal carrying wires equal to j. These wires are identified in a priority sequence o ... j. Thus the j low order bits of a priority code correspond to a particular wire of the request cable. Each unit has means for comparing the i bits of the local counter with the i high order bits of its priority code and for signaling a request on the wire of the request cable that corresponds to the low order bits of its priority code. A unit accepts priority to the next time slot only if no higher priority request line carries a signal.

Some of the advantages of the system can be seen by considering the specific example that has been used so far. In place of a 4 bit counter that divides the time slot into a minimum of 16 sub-slots, the local counter has only 2 bits and operates at only one-fourth the clock rate to divide the time slot into 4 sub-slots. Similarly, the circuits associated with the j wire cable operate at this slow speed and thereby can be made up of slower speed cable and slower speed components. These advantages also permit this system to operate with more units on the bus than there are bit periods within a time slot. To continue the example that has been used so far, the system of this invention could accommodate 20 units on the bus by using a $j=5$ wire cable or 32 units by using an $i=3$ bit local counter.

Other objects and features of the invention will be apparent from a detailed description of a preferred embodiment of the invention.

THE DRAWINGS

FIG. 1 is a block diagram of a network of units using the method and apparatus of this invention to communicate on a common bus.

FIG. 2 is a more detailed diagram of the logic for a representative unit of this system of FIG. 1.

FIG. 3 is a timing chart illustrating the operation of the circuit of FIG. 2.

SYSTEM OF THE DRAWING

Introduction—FIG. 1

FIG. 1 shows a data bus 12 that interconnects a number of units A, B, C ... N of a data processing system. For generality, the number of units that share the data bus will be designated n. The number of units n is equal to or less than the product ij where $i+j$ is the number of bits required for assigning a priority number to each unit. The bus can be in any conventional form, and it can be thought of as a coaxial cable for serial transmission of data in successive time slots of uniform duration or at least of a uniform minimum duration. This conventional operation is shown FIG. 3, lines A, B and C where each time slot is divided into 16 bit times by a data clock. FIG. 3 is divided into two time slots 1 and 2. Time slot 1 is shown as idle and a priority operation takes place in time slot 1 that gives a unit access to time slot 2. The system of FIG. 1 also includes a request bus 15 that carries a signal produced by a unit that has taken priority to the next time slot. Line 15 represents a set of two or more signal carrying wires.

The Local Priority Circuit—FIG. 2

In FIG. 2, bus 15 is shown as a set of four lines 16, 17, 18 and 19 which correspond to the priority codes 00, 01, 10 and 11. A unit is connected to produce priority signals on one of these lines according to the j low order bits of its priority code, and it is also connected to respond to signals placed on the bus by other units. In the general operation of the priority circuit, four or fewer units have access to the bus during a sub-slot of a time slot and if more than one of these units makes a request, only the highest priority unit is permitted take priority.

The priority code of the unit of FIG. 2 is held in a register 20 or other suitable means. The register may be loaded under control of a system processor or it may be set by service personnel by simply attaching the register output wires 22-25 to potential points that provide 1 or 0 logic level voltages. The drawing continues the example introduced earlier in which unit A has the priority code 0010 formed by connecting wire 24 to a positive potential point and connecting wires 22, 23 and 25 to ground.

The local unit also has a counter 28 that has two bit positions representing the general case of i high order bits of the priority code. This counter is advanced by a clock pulse source 29.

The priority apparatus of FIG. 2 is activated when the unit produces a 1 logic level signal on a line 30, Local Request. This signal is available in any terminal device that is intended for use on a shared bus. A compare circuit 32 includes Complement Exclusive OR circuits 34, 35 for each stage of register 28 and a gate 36 that responds to the coincidence of a match signal at the output of each gate 34, 35. The output 37 of gate 36 represents a match between the high order bits of the priority code in register 28 and the corresponding bits in register 20 and the coincidence of a Local Request signal on line 30.

When a signal occurs on line 37, a request is placed the wire of bus 15 that is identified by the low order bits in register 20. FIG. 2 shows a general purpose decoder circuit 39 that responds to any code in the low order bit position of register 20, but the general function of transmitting the signal on line 37 to a pre-selected one of lines 16-20 of bus 15 can be provided in various ways. The decoder is conventional and has gates 40-43 and inverters 44, 45. Thus, in the example in which the low order bits of the priority code for unit A are 10, the 0 at bit position o of register 20 appears as an inhibiting input to AND gates 41 and 43 and the complement of this signal appears as an enabling 1 input to gates 40 and 42. The 1 at the high order bit position appears as a 0 at gates 40 and 41 and appears as a 1 in gates 42 and 43 so that only gate 42 is conditioned to respond to its other inputs. The output of gate 42 is connected to request wire 18 which has the priority assignment 10.

The AND gates 40-43 of the priority code low order bit decoder are also arranged to respond to the signal on line 37. The decoder is also arranged to resolve priority when two or more requests appear on bus 15 during the same sub-slot. Inverter circuits 46, 47, 48 produce inhibiting inputs to AND gates 41, 42, 43 for each lower priority line.

The circuit produces a signal Request Accepted when only the local request from line 30 remains on bus 15 and the logical operation to reject all lower priority requests has been completed. In the circuit of the drawing, an OR gate 50 and an AND gate 51 respond to the presence of a signal at the output of any gate 40-43 at a time t when any lower priority requests have been removed from the bus. (See FIG. 3, Line I*.) A suitable timing signal can be derived from a phase of counter 28 as is conventional. Similarly, a gate 52 responds to the presence of a signal on any wire 16–19 to signal the end of the poll and to produce a signal on a line 54 to stop (or reset) counter 28. (Gates 56–59 isolate gate 50 from signals on bus 15 produced by other units.) The presence of a signal from any unit on the bus stops counter 17 and the fall of this signal restarts and preferably resets the counter at the beginning of the next poll. The logic functions of FIG. 2 can of course be organized in a variety of ways.

Operation

FIG. 3 represents an example in which only four units have requests to make during time slots 1 and 2. These units will be identified as G, H, I and J corresponding to the identifying letters for the lines in the drawing. For this example, the four units have the priority code assignments shown in Table 2.

TABLE 2

| | |
|---|---|
| G | 1000 |
| H | 0101 |
| I | 0110 |
| J | 1111 |

The two low order bits of each priority code have been made different to simplify the example but in the more general case any units can request access to the bus on any time slot. The two high order bits of the priority codes correspond to the local count that is established by counter 28 in FIG. 2 and is shown in lines E and F of FIG. 3. Line E shows the waveform of low order bit position and line F shows the high order bit position waveform. Since the high order bits of the priority code of unit G are 10, unit G will produce the signal on line 37 at the local count 10 in FIG. 3 lines E and F and this transition in the waveform on line 37 is shown at 53 in FIG. 3. Similarly, both units H and I have high order priority code bits 01 and can raise the request signal on line 37 at count 01 as shown by waveform transitions 54 and 55 in FIG. 3. Unit J produces this transition on its line 37 at local count 11 shown at 56 in FIG. 3. These sgnals fall with the next transition of counter 28 but will rise at the corresponding point in the next time slot if access to the data bus is still requested. Thus, the effect of the high order bits of the priority code and the compare circuit 32 and associated components in FIG. 2 is to separate units G, H, I and J into three sub-slots such that units H and I have an earlier pole than unit G and unit G has an earlier pole than unit J. Considered from a different standpoint, counter 28 defines the columns in Table 1.

FIG. 3, lines G*, H*, I* and J* show the signals that appear on the Request lines 16–19 associated with units G, H, I and J. At count 01, units H and I find equality between the local counter 28 and their high order priority code bits and gate 41 of unit H and gate 42 of unit I simultaneously raise the signals shown at 60 and 61 in lines H* and I* of FIG. 3 respectively. In unit I, the signal produced on line 17 (H*) by unit H appears as an inhibiting input to gate 42 and the signal on line 18 (I*) falls at 63. The signal on line 17 stays up throughout the rest of time slot 1 and this signal inhibits units G and J from raising signals on lines 16 and 19 at later sub-slots of time slot 1. In response to the presence of the signal at the output of gate 50 at a time t after transition 63, the signal Request Accepted at the output of gate 51 of unit H rises. In response to this signal, conventional components of unit H begin transmitting in the next time slot. In the specific circuit that has been described, the fall of the signal on line 54 starts the counter 28 running synchronously again, preferably with the count beginning at 0000. When this operation is performed by stopping and later restarting the counter as described, the waveforms of FIG. 3, lines E and F remain at lines 65, 66 until the end of time slot 1. Alternatively, the counter can be run continuously and line 37 can be latched up or down as priority is established.

From the description of a preferred embodiment of the invention, those skilled in the art will recognize suitable variations in implementation to adapt the invention to various communication systems.

Having thus described our invention, what we claim as new and desire to secure by Letters Patent is:

1. A data processing unit having means for accessing a resource of a data processing system, such as a common data bus during assigned time slots as one of n units sharing the resource and having means for communicating with the other units on a request bus having j signal carrying conductors, where j is greater than 1 comprising, an i bit counter and means for running the counter in synchronism with counters of other units sharing the resource at a rate to count through a pre-determined sequence of count values during each time slot, where i+j is the number of bits required to assign each of the n units a unique priority code, means providing a pre-assigned priority code of i+j bits, means comparing the i bits of the priority code with the i bits of the counter and signifying a match or a mis-match, means responsive to a match to produce a request signal on a pre-determined one of the request lines corresponding to the j bits of the priority code, means responsive to the absence of a request signal on any of the j lines at a time preceding a match and to the absence of a request signal on any higher priority request line in the event of a match to enable the unit to access the resource in the next time slot.

2. A communications system for a n data processing unit having means for communicating during assigned time slots on a common data bus, comprising, a request bus having j signal carrying conductors where j is greater than 1.

an i bit counter for each unit and means for running each counter in synchronism with counters of other units on the data bus at a rate to count through a pre-determined sequence of count values during each time slot, where i+j is the number of bits required to assign each of the n units a unique priority code, each count of said counter defining a sub-slot, means providing a pre-assigned priority code of i+j bits for each unit, means for each unit for comparing the i bits of the priority code with the i bits of the counter and signifying a match or mis-match, means for each unit responsive to a match to produce a request signal on a pre-determined one of the request lines corresponding to the j bits of the priority code, means responsive to the absence of a request signal on any of the j lines at a time preceding a match and to the absence of a request signal on any higher priority request line in the event of a match to enable the unit to transmit a message on the data bus in the next time slot.

3. The system of claim 2 wherein the data bus operates at a pre-determined minimum number of bit times m during a time slot and wherein the length of a sub-slot is equal to or greater than the length of a bit time and the number of units n is greater than the number of bit times m.

4. A polling system for n data processing units operable in time slots of a pre-determined minimum duration, comprising, a request bus having j signal carrying conductors where j is greater than 1 and further comprising for each unit, an i bit counter and means for running the counter in synchronism with counters of other units at a rate to count through a pre-determined sequence of count values during each time slot, where $i+j$ is the number of bits required to assign each of the n units a unique priority code, each count of said counter defining a sub-slot, means providing a pre-assigned priority code of $i+j$ bits, means comparing the i bits of the priority code with the i bits of the counter and signifying a match or mis-match, means responsive to a match in one sub-slot to terminate the generation of further sub-slots and means for signaling between units on said request bus the relative priorities of a plurality of units making a request in the same sub-slot whereby the unit of highest priority takes access to the next time slot.

* * * * *